US011681805B1

(12) United States Patent
Oakley et al.

(10) Patent No.: US 11,681,805 B1
(45) Date of Patent: Jun. 20, 2023

(54) SYSTEM FOR ANALYTIC DATA MEMORIALIZATION, DATA SCIENCE, AND VALIDATION

(71) Applicant: MORGAN STANLEY SERVICES GROUP INC., New York, NY (US)

(72) Inventors: Jonathan Oakley, Woodruff, SC (US); Joseph Edmonds, Ellicott City, MD (US)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 17/826,153

(22) Filed: May 26, 2022

(51) Int. Cl.
*H04L 9/40* (2022.01)
*G06F 21/56* (2013.01)

(52) U.S. Cl.
CPC ........ *G06F 21/566* (2013.01); *H04L 63/1425* (2013.01)

(58) Field of Classification Search
CPC .......................... G06F 21/566; H04L 63/1425
USPC .......................................................... 726/22
See application file for complete search history.

(56) References Cited

U.S. PATENT DOCUMENTS

| 7,634,807 | B2* | 12/2009 | Yan | G06F 21/57 713/169 |
| 7,908,653 | B2* | 3/2011 | Brickell | G06F 21/51 709/215 |
| 8,479,286 | B2* | 7/2013 | Dalcher | G06F 21/552 726/22 |
| 8,484,727 | B2* | 7/2013 | Zaitsev | G06F 21/566 726/22 |
| 8,528,080 | B2* | 9/2013 | McCorkendale | H04L 63/145 726/22 |
| 8,793,787 | B2* | 7/2014 | Ismael | H04L 63/145 726/1 |
| 8,887,278 | B2* | 11/2014 | Repasi | G06F 21/566 726/22 |
| 8,904,537 | B2* | 12/2014 | Turkulainen | G06F 21/566 713/193 |
| 9,262,311 | B1* | 2/2016 | Johnston | G06F 11/3696 |
| 9,992,217 | B2* | 6/2018 | Taylor | H04L 69/22 |
| 11,245,601 | B2* | 2/2022 | Wang | H04L 43/08 |
| 2010/0106695 | A1 | 4/2010 | Calder et al. | |
| 2012/0179742 | A1 | 7/2012 | Acharya et al. | |
| 2013/0311521 | A1 | 11/2013 | Calder et al. | |
| 2013/0347116 | A1 | 12/2013 | Flores et al. | |

(Continued)

*Primary Examiner* — Badrinarayanan
(74) *Attorney, Agent, or Firm* — Weitzman Law Offices, LLC

(57) ABSTRACT

A system for collecting data artifacts from a production environment, storing them, and replaying them in a testing environment is disclosed. One or more processors receive a data artifact from a sensor in a production environment, and store the data artifact in a first storage with a unique identifier, while also storing in a second storage record(s) associating the unique identifier with a tag. A clone of at least a portion of the production environment is created within the testing environment, and an analytic targeting the data artifact is incorporated into the clone. Upon receiving a request to replay the data artifact, referencing the tag associated with the data artifact's unique identifier, the data artifact is replayed by causing the clone to receive the data artifact as if it were presently encountered. Logs of output from the clone's response are stored in a third storage for future analysis.

24 Claims, 5 Drawing Sheets

(56) References Cited

U.S. PATENT DOCUMENTS

| | | |
|---|---|---|
| 2014/0317061 A1 | 10/2014 | Rao et al. |
| 2015/0172311 A1* | 6/2015 | Freedman et al. |
| 2016/0004734 A1* | 1/2016 | Naryzhny ............... G06F 16/22 |
| | | 707/736 |
| 2017/0085588 A1 | 3/2017 | Laidlaw et al. |
| 2017/0214575 A1 | 7/2017 | Asenjo et al. |
| 2017/0223037 A1 | 8/2017 | Singh et al. |
| 2018/0025157 A1 | 1/2018 | Titonis et al. |
| 2019/0034254 A1 | 1/2019 | Nataraj et al. |
| 2019/0079968 A1 | 3/2019 | Griffith et al. |
| 2019/0121807 A1 | 4/2019 | Boutros et al. |
| 2019/0129972 A1 | 5/2019 | Borate et al. |
| 2019/0319980 A1 | 10/2019 | Levy et al. |
| 2019/0324987 A1 | 10/2019 | Kamath et al. |
| 2019/0354713 A1 | 11/2019 | Surla et al. |
| 2019/0361891 A1 | 11/2019 | Griffith et al. |
| 2019/0370360 A1 | 12/2019 | Mainali et al. |
| 2019/0370362 A1 | 12/2019 | Mainali et al. |
| 2019/0370365 A1 | 12/2019 | Chalakov et al. |
| 2020/0019539 A1 | 1/2020 | Ni |
| 2020/0026429 A1 | 1/2020 | Chen et al. |
| 2020/0089666 A1 | 3/2020 | Naryzhny et al. |
| 2020/0125386 A1 | 4/2020 | Busick et al. |
| 2020/0137086 A1 | 4/2020 | Pedasingu et al. |
| 2020/0151202 A1 | 5/2020 | Bolcer et al. |
| 2020/0394231 A1 | 12/2020 | Raghavan et al. |
| 2021/0110047 A1 | 4/2021 | Fang |
| 2021/0112090 A1 | 4/2021 | Rivera et al. |
| 2021/0182381 A1 | 6/2021 | Adams et al. |
| 2021/0216407 A1 | 7/2021 | Borate et al. |

* cited by examiner

SYSTEM FOR ANALYTIC DATA MEMORIALIZATION, DATA SCIENCE, AND VALIDATION

FIELD OF INVENTION

This disclosure relates to systems and methods for facilitating analysis of potential malware, and more specifically, to systems and methods for memorializing source artifacts, replaying artifacts on a sandboxed system, and storing logs of replays for future querying.

BACKGROUND

Various organizations operating computer networks often monitor those networks and the computing devices connected to them for a variety of possible threats or evidence of malfunction. Examples of these possible threats might include a tile that, if executed, would infect a computing device with a virus or spyware; a series of network packets that would circumvent desired network behavior, such as a denial of service attack or a message that would bypass a firewall due to a security flaw; or an anomalous series of interactions that indicate an individual is operating a computer so as to exceed an authorization to access protected data.

If a possible malware is identified "in the wild" on a network by one system, that system may trigger an alert and save a copy of the suspect software in a database for identifying signatures to be used in future detection. Conversely, virtual machines and other sandboxing software exist for operating software in an isolated environment to monitor behavior without placing computing assets at risk. However, existing monitoring systems typically separate the functionality of processing artifacts to analyze them in real time from the functionality of retrieving and executing an artifact for analysis or regression testing at a future time.

Thus, there are advantages to streamlining both the capture and replay of artifacts in a single system to increase the efficiency of analysis and protect computing systems from possible threats to their proper functioning.

SUMMARY OF THE INVENTION

A system for collecting data artifacts from a production environment, for storing the data artifacts, and for replaying the data artifacts in a testing environment is disclosed. One or more processors to receive a data artifact from a sensor in a production environment, and store the artifact in first storage with a unique identifier, while also storing in a second storage one or more records associating the unique identifier with a tag. A clone of at least a portion of the production environment is created within the testing environment, and an analytic targeting the artifact is incorporated into the clone. Upon receiving a request to replay the artifact, referencing the tag associated with the artifact's unique identifier, the artifact is replayed by causing the clone to receive the artifact as if it were an artifact presently encountered. Logs of output from the clone in response to encountering the artifact are stored in a third storage for future analysis.

Similarly, a computer-implemented method for collecting artifacts from a production environment, for storing the artifacts, and for replaying the artifacts in a testing environment is disclosed. The method comprises receiving a data artifact from a sensor in the production environment, storing the artifact in a first storage with a unique identifier, and causing one or more records associating the unique identifier with a tag to be stored in a second storage. Next, the method comprises creating a clone of at least a portion of the production environment within the testing environment and receiving an analytic targeting the artifact and incorporating the analytic into the clone. Upon receiving a request to replay the artifact by referencing the tag associated with the artifact's unique identifier, the method finally comprises replaying the artifact by causing the clone to receive the artifact as if it were an artifact presently encountered in the production environment and causing to be stored in a third storage one or more logs of output from the clone in response to encountering the artifact.

Additional features include variations of the above system and method wherein:
artifacts arc received both from a sensor internal to a network used by computing devices that may be affected by the data artifacts being transmitted over the network, and from sources external to the network;
a plurality of different artifact types are stored together in the first storage, including captured network packets, files, and logs;
a source of the received analytic and/or the source of the received request are prohibited from accessing the first storage directly, and can only indirectly access an artifact via referencing the unique identifier of that artifact; and/or
an interface is provided for querying the one or more logs of output based at least in part on the unique identifier, and further allows for querying based additionally on a wildcard term; and/or
the second storage stores information on one or more artifacts to be periodically re-run through the clone of at least a portion of the production environment for regression testing.

BRIEF DESCRIPTION OF THE DRAWINGS

Other aspects, features and advantages will become more fully apparent from the following detailed description, the appended claims, and the accompanying drawings (provided solely for purposes of illustration without restricting the scope of any embodiment), of which:

DETAILED DESCRIPTION

In order to address the above-mentioned limitations of previous malware analysis systems, a system is described that supports development of analytics for known or possible malware, and validation workflows for testing those analytics on new malware or regression-testing the analytics on older malware.

The system compiles a version-controlled generic repository of memorialized (or "memo-ized") artifacts of all types, regardless of whether the artifacts represent executable files, packets captured from network traffic, or any other loggable occurrence. A user interface is provided to allow analysts to trigger "replay" of the artifact on a testing clone of an existing analysis system. During the "replay," automated systems or human analysts observe whether analytics on the production version of the analysis system would have flagged or otherwise properly responded to the artifact.

By enabling "replay" of a previously encountered file, network transmission, or other occurrence in a clone system with the designed detection analytics running live, regression testing may be performed and statistical information may be gathered. This information may be used to demonstrate to an auditor or other stakeholder that analytics continue to be effective and that legal requirements or service level agreement requirements continue to be met. Newly developed or proposed analytics can be rapidly tested by analysts with instantaneous feedback from testing suites and the regression testing of the analytics on known previous occurrences of malware. Further, because the generic repository may include not only previously seen artifacts from within a given network, but also artifacts downloaded from other sources external to that network, analytics can be tested on novel threats before they are observed on the network for the first time.

In addition to the organizational benefits from ensuring legal compliance and service level agreement compliance, networks operated by an organization will be protected by better-targeted analytics, reducing the incidence of both malware and non-malware false-positives demanding human investigation or response. The efficiency of a network and the efficiency of all the computing devices connected to it are improved when malware can be detected and blocked by routers or firewalls before it affects any network node.

Figure 1:
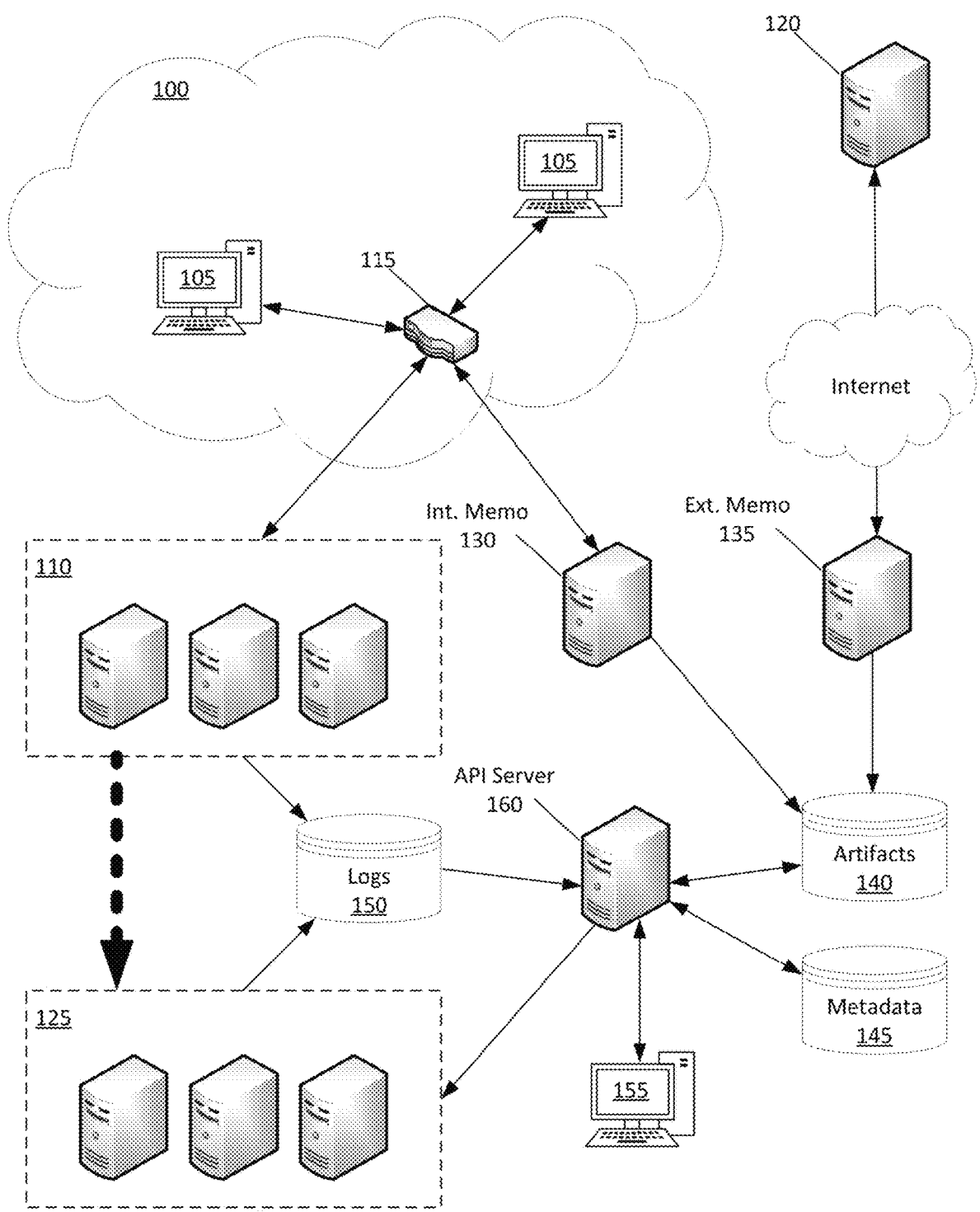
FIG. 1 illustrates, in simplified form, a system of computing devices used to analyze possible malware or campaigns and develop and test analytics for recognizing future malware and campaigns.

FIG. 1 illustrates, in simplified form, a system of computing devices used to analyze possible malware or campaigns and develop and test analytics for recognizing future malware and campaigns.

An organization may operate a network 100 of computing devices 105 to be defended from possible malware. In order to gather data about present threats or unexpected behavior, the organization may continually operate an analysis sub-system 110 that receives data from network sensors 115 or other sensors of computing activity. Data from the sensors 115 might include, in various embodiments, captured packets that had been transmitted over the network, files that had been transmitted over the network, or, if original files or network packets cannot be obtained, operating system logs or other software logs of activity by the computing devices 105. The analysis sub-system 110 may also receive data from one or more external sources 120, the data being known to be malicious or representative of malicious software previously seen on other networks, such as virus definitions, network packets captured during a previous malware campaign, logs of behavior from a known, compromised device, etc. Examples of external sources may include malware definitions provided by services such as VirusTotal, McAfee, or Symantec; examples made available on GitHub or other repositories; or other resources for spreading knowledge of past or current malware campaigns. The analysis sub-system continually compares internal network data from the sensors 115 to analytics that are custom designed by software developers or that incorporate data from the external sources 120, in order to alert a human reviewer of a possible malware threat, or to take automated action such as deleting a file, blocking network traffic, or otherwise affecting the function of a computer or network node to prevent malware from spreading or acting.

In order to improve the performance of the analysis sub-system 110, a parallel testing system 125 is operated to facilitate the development of new malware analytics and regression test their performance on past threats. The parallel testing system 125 is intended to be functionally identical to the analysis sub-system 110; in a preferred embodiment, Kubernetes is used to clone a set of network traffic analysis, file analysis, and/or log analysis modules used by the analysis sub-system 110, ensuring that the same configuration settings are used and that the parallel testing system is as faithful a replica of the system in production as is possible. It is preferable to have the parallel testing system 125 be provided as a cloud-based system not necessarily tied to any particular location or hardware, and be accessible for testing purposes from any location and not only on the same network 100.

To store data while awaiting its use in the parallel testing system 125, a pair of "memorializers" 130 and 135 capture streams of data to store as artifacts in a first, undifferentiated storage 140 as well as store metadata related to the artifacts in a second storage 145. The internal memorializer 130 captures the aforementioned packets, files, or logs related to activity on the network 100, while the external memorializer 135 routinely receives updates from the external sources 120.

In a preferred embodiment, the undifferentiated storage 140 is an Amazon S3-compatible or similar data bucket system that acts as a data lake for storing a variety of file types as binary large objects (BLOBs), whether the underlying data is an executable file, a non-executable file, captured network packets, logs, or any particular filetype. Each captured artifact has a unique identifier, which either is assigned the UID or has its UID generated by a hash or similar function that takes the artifact as input. A hash function is preferable, as it will ensure that if the same artifact is encountered at a future time, the storage 140 will recognize that the artifact is already stored, and not store a duplicate. Direct read/write access to the storage 140 is strictly controlled and analysts are only able to access the files indirectly, by using an API to instruct the parallel testing system 125 to be provided an artifact and to interact with it (for example, executing, modifying, copying, moving, deleting, or otherwise changing an aspect of the artifact or allowing the artifact to change aspects of a system or environment in which it is executed). As a result of the wall the API creates between analysts' computers and the artifact storage, no leakage of malicious content occurs, and analysts' computing devices are safe regardless of how vigilant or careful a particular analyst is.

The metadata storage 145 is preferably more structured and preferably contains a series of JSON (JavaScript Object Notation) "workbench" files that each refer to one or more artifacts stored in the storage 140 by their unique identifiers, and that each may also associate the files with additional relevant information, such as human analyst-generated notes, automatically-generated documents, definitions or signatures (such as a YARA file), or any other information that may need to be associated with an artifact to provide relevance or context during later analytic development.

For example, in a preferred embodiment, a JSON workbench file "phishing.bench" might contain:
```
{
   "files": [ ],
   "pcap": [
      {
         "bucket": "bench_artifacts",
         "key":            "pcap/20220406_0356fc71-fcaf-
            095400ddd49a.pcap"
      }
   ],
   "logs": [
      {
         "bucket": "bench_artifacts",
         "key": "logs/baa1001e-a0ff-4dda-945e.json"
      }
   ]
}
```
indicating that the particular analytic for detecting a phishing attempt is not associated with any particular file artifact, but should be able to identify a particular series of network traffic as a phishing attempt, or if provided with logs from other software, should be able to identify from those logs that a phishing attempt occurred. The "bucket" and "key" values indicate where the storage 140 is within a larger database system and how to find the particular artifacts within that storage.

The metadata storage 145 is preferably hierarchically organized, allowing multiple workbench files to be tagged and included in a single group, category, or project. This hierarchical or tag-based storage makes it easier to later set up a test suite that targets all artifacts with a particular tag or association.

The metadata storage 145 may also store analyst-generated data that is not associated with a workbench file, such as text notes, other documents, proofs of concept that are still in development, or any other data that may help organize thoughts or projects, and that may ultimately be associated with an artifact or testing suite. Preferably, version control is provided for the metadata storage 145 to allow an analyst to go back to a previous version of any file that was stored there, even after changes have been introduced. In one embodiment, the metadata storage 145 is a Git repository.

A third data store for output 150 is used to store logs generated by the parallel testing system 125. This separate data store serves several purposes.

First, by associating logs with a unique identifier, the unique identifier can be an indexed key and greatly accelerate the querying of logs by analysts. This unique identifier could be the identifier of an artifact whose replay caused the log to be created, but in a more preferred embodiment, a unique "flow identifier" or replay identifier is generated every time replay of an artifact is requested, and is propagated to all analysis output. Because a replay of an artifact at a first time may cause different reactions in the simulated system than replay of the same artifact at a later time, searching by artifact identifier alone may yield excessive data (if it has been replayed many times) or stale data (if analytics have substantially changed since the last replay). Being able to search for a flow identifier or replay identifier, representing a particular moment in time and a particular encounter with a file, allows queries to pinpoint data with greater accuracy, reduce the amount of data that will need to be filtered or reviewed, and accelerate an analyst's ability to interact with the logs. Regression testing of an analytic's effectiveness can be facilitated by providing two flow identifiers of replays that interacted with the same artifact and reviewing how the logs associated with each flow identifier differ or remain the same.

Second, the data store 150 can be routinely flushed or have stale data cycled out in order to keep queries responsive, compared to log databases in production that might have staggering quantities of data that cannot yet be archived or deleted. By limiting the scope of the logs and providing the capacity to search logs by a unique identifier, some query tools (such as wildcards, ranges, or statistical summary functions like max( ) or average( )) may become feasible when they would be infeasible for a larger database. In contrast to the artifact database 140, which is intended to store artifacts indefinitely, the log data store 150 is intended to be ephemeral and may be flushed, pruned, or otherwise redacted at any time.

One or more analysts' computers 155 are used to develop analytics intended for ultimate use in the analysis sub-system 110 to protect computing devices 105 on the network 100. In order to mitigate the dangers of executing possible malware while testing the ability of new analytics to detect or classify previously seen artifacts, the present system walls off the artifact storage 140 from the analysts' computing devices 155 completely. Instead, analysts' computing devices are able to access the metadata storage 145 and the log output storage 150, which store files that have the unique identifiers of artifacts in the storage 140. The unique identifiers allow indirect manipulation of the artifacts without directly exposing the artifacts to the analysts' computing devices and allowing those devices to open artifacts or execute code from within them, or even to know the location or filename of those artifacts.

The most important form of this indirect manipulation is the "replay" of an artifact, as described in greater detail below, in relation to FIG. 4. After a new analytic has been developed, it is deployed to the parallel testing system 125. One or more relevant artifacts specified in a workbench file are retrieved from the artifact storage 140 and provided to or simulated within the parallel testing system 125. The results of the replay are stored in log output storage 150 and/or provided to the analyst.

In order to request replays, upload analytics, access the metadata stored in the metadata storage 145, access the logs stored in log output storage 150, delete metadata or logs, or any other actions an analyst might want to undertake, a web server 160 or other server providing an API through an interface other than a web browser is provided. The server receives requests from analysts' computing devices 155 and interfaces directly with the analysis sub-system 110, parallel testing system 125, the artifact storage 140, the metadata storage 145, and the log output storage 150 to implement whatever command is received via the web page or other API.

Although a particular division of functions between devices is described with relation to the systems depicted in FIG. 1, above, other configurations are possible in which functions are divided among devices differently. For example, all of the functions of some or all of the first artifact storage 140, second metadata storage 145, and third log storage 150, or of the parallel testing system 125 and web server 160, may be performed by a single device with multiple threads executing different software modules simultaneously.

Alternatively, each system or device from among the analysis subsystem 110, parallel testing system 125, internal memorializer 130, external memorializer 135, first artifact storage 140, second metadata storage 145, third log storage 150, and web server 160 may in fact be a cluster of computing devices sharing functionality for concurrent processing. Further, although these various computing elements are described as if they are one computing device or cluster each, a cloud-based solution with multiple access points to similar systems that synchronize their data and are all available as backups to one another may be preferable in some embodiments to a unique set of computing devices all stored at one location. The specific number of computing devices and whether communication between them is network transmission between separate computing devices or accessing a local memory of a single computing device is not so important as the functionality that each part has in the overall scheme. What does remain of importance is that none of the analysts' computing devices 155 are permitted to directly access the files in the artifact storage 140, to prevent leakage of potentially malicious content.

Figure 2:
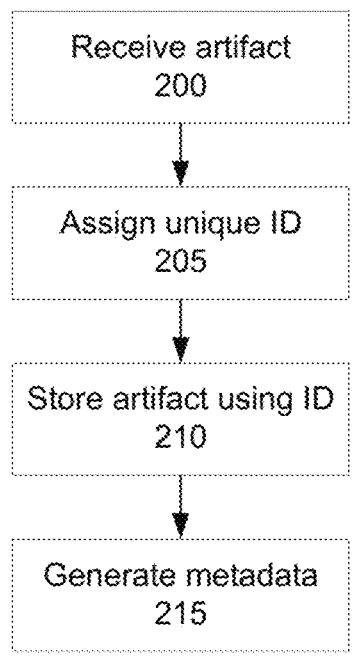
FIG. 2 illustrates, in simplified form, a method of obtaining artifacts for future analysis.

FIG. 2 illustrates, in simplified form, a method of obtaining artifacts for future analysis.

First, an artifact is received from a memorializer 130 or 135 (Step 200). Next, a unique identifier is assigned to the artifact (Step 205). As previously mentioned, it is preferable to have a hash function taking the artifact itself as input be used to determine the identifier so that deduplication of inputs occurs.

The artifact is then stored in the artifact storage 140 using the unique identifier as the file name (Step 210). In a preferred embodiment, the artifact storage may be organized into buckets based on artifact type, as shown in the workbench file example above with a "pcap" bucket for captured network packets and a "logs" bucket for software log output. In other embodiments, no hierarchical structure may be necessary or desired.

Finally relevant metadata may be stored in the metadata storage 145 and associated with the stored artifact to ensure the artifact is accessible to an analyst (Step 215). For example, a workbench file might be created that associates a particular artifact with a particular source 115 or 120, with a particular range of time, with a particular analytic known to already trigger on the artifact, or with any other known association the artifact may have. Because analysts are unable to load files directly from the artifact storage 140, the queryable metadata is vital for accessing and identifying artifacts for replay.

Figure 3:
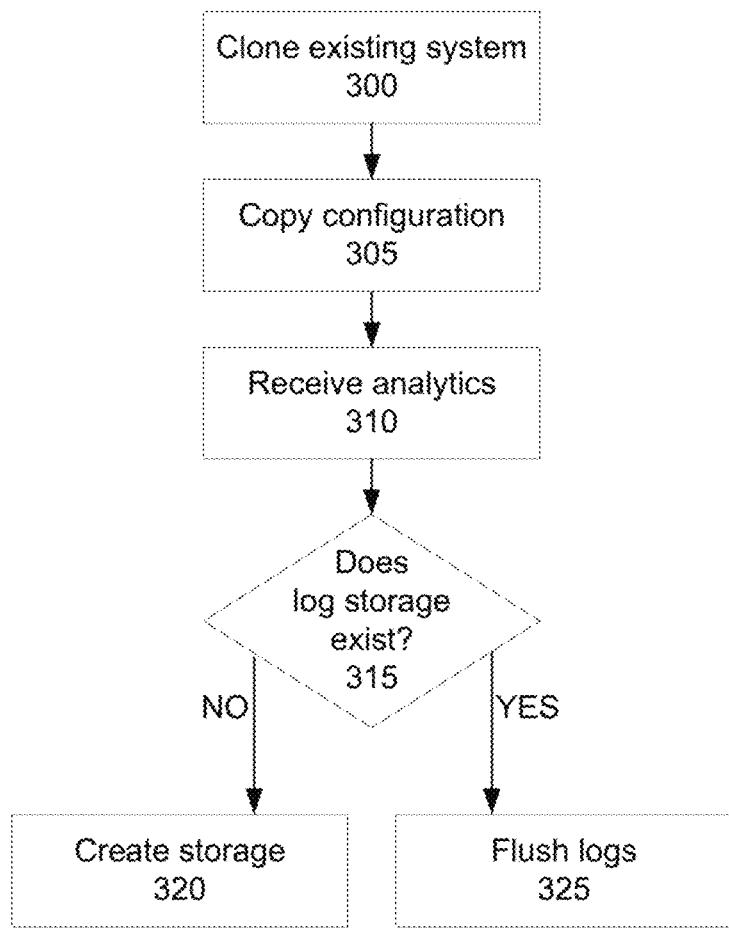
FIG. 3 illustrates, in simplified form, a method of providing a cloned analysis system to test analytics.

FIG. 3 illustrates, in simplified form, a method of providing a cloned analysis system to test analytics.

In a preferred embodiment, Kubernetes is used to create a clone 125 of at least some of the software currently running on the existing analysis system 110 (Step 300), in order to be able to simulate at least some of the functionality of that analysis system. In other embodiments, other software provisioning, emulation, or virtualization products or methods may be used to create as faithful a replica as possible of the entirety or of a relevant part of the existing analysis system.

Various configuration files for that software, including existing analytics already running on the existing analysis system 110, are retrieved and applied to the cloned, parallel analysis system 125 (Step 305).

One or more new analytics to be tested are received from analysts and incorporated into the cloned, parallel analysis system 125 (Step 310).

If the third storage 150 for logs doesn't already exist (Step 315) as part of the cloned system 125, it is created (Step 320). If it does exist, it is preferably flushed (Step 325) rather than copy over an overwhelming number of logs for an analyst to sort through, and which will not be associated with the unique identifiers of the data artifacts anyway.

Figure 4:
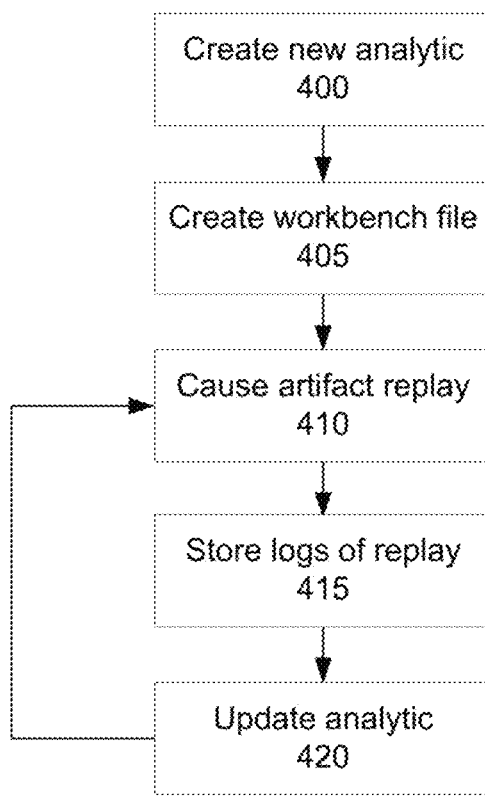
FIG. 4 illustrates, in simplified form, a method of performing an analytic validation or regression test in response to an analyst request.

Once the cloned parallel analysis system 125 has been provisioned, it is ready to receive a request to replay an artifact, as depicted in FIG. 4.

FIG. 4 illustrates, in simplified form, a method of performing an analytic validation or regression test in response to an analyst request.

First, an analyst creates an analytic to be tested and provides it to the testing system (Step 400). If the parallel analysis system 125 already exists, the analytic is incorporated into it; if not, it is created via the method described in FIG. 3, above, before adding the analytic to it.

Next, the analyst creates a workbench file (Step 405) identifying one or more artifacts to be replayed in the parallel analysis system, in the hopes the new analytic will identify the artifacts during the replay.

The analyst, via interaction with the API provided by the server 160, causes the cloned system to replay the artifacts (Step 410). A "replay" involves, depending on the artifact type, actually generating identical network traffic and send it to a network sensor/packet sniffer in the cloned system, actually transmitting a file to a software module in the cloned system for execution, sending identical logs to a log parser operating in the cloned system, etc. As previously mentioned, every replay is assigned a unique "flow identifier" or replay identifier that is included in every log generated during the replay.

Whatever the results of the cloned system's interaction with the data artifact, the output logs of software that interacted with the data artifact are stored in the log storage 150 (Step 415). These logs are tightly coupled with the flow identifier and may also include information regarding unique identifiers of data artifacts that were replayed. Various analytics and data science environments can be redirected to search this log database instead of any other log database being used in production. Analysis of logs is made much more efficient by indexing the logs based on flow identifier and optionally based on artifact identifier, rather than requiring that they be searched based on textual or timestamp filters alone.

After reviewing the logs, the analyst may update the analytic (Step 420) and replay the analytic yet again (back to Step 410), generating a second, new flow identifier and set of logs that are associated with that new flow identifier. In some embodiments, automated regression testing may be periodically used to ensure that analytics are still catching old artifacts that are known to be malicious, even after updates to catch newly found malicious artifacts.

Although FIG. 1 depicts a preferred configuration of computing devices and software modules to accomplish the software-implemented methods described above, those methods do not inherently rely on the use of any particular specialized computing devices, as opposed to standard desktop computers and/or web servers. For the purpose of illustrating possible such computing devices, FIG. 5, below, describes various enabling devices and technologies related to the physical components and architectures described above.

Figure 5:
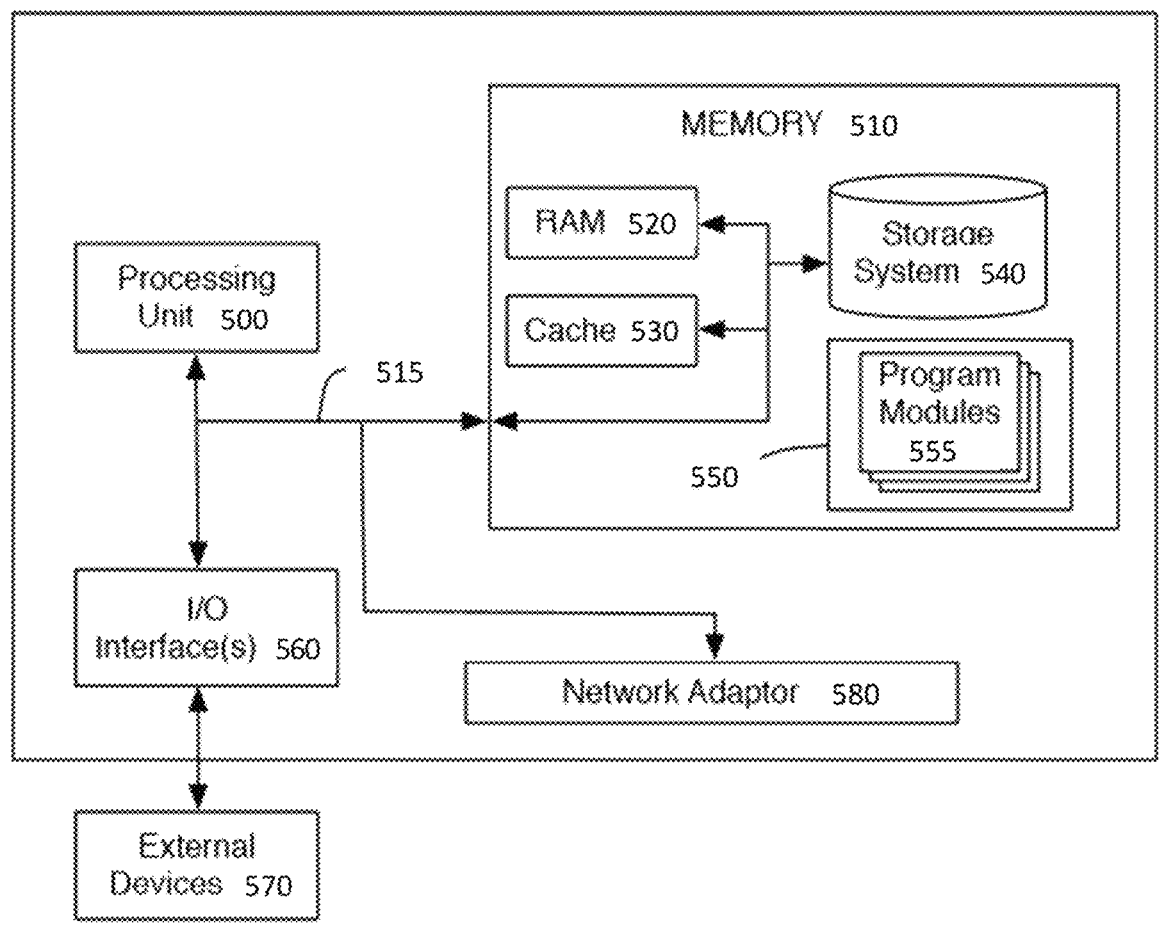
FIG. 5 is a high-level block diagram of a representative computing device that may be utilized to implement various features and processes described herein.

FIG. 5 is a high-level block diagram of a representative computing device that may be utilized to implement various features and processes described herein, for example, the functionality of the computing devices 105, analysis subsystem 110, network sensors 115, external sources 120, parallel testing system 125, internal memorializer 130, external memorializer 135, first artifact storage 140, second metadata storage 145, third log storage 150, analysts' computing devices 155, and web server 160, or any other computing device described. The computing device may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 5, the computing device is illustrated in the form of a special purpose computer system. The components of the computing device may include (but are not limited to) one or more processors or processing units 500, a system memory 510, and a bus 515 that couples various system components including memory 510 to processor 500.

Bus 515 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Processing unit(s) 500 may execute computer programs stored in memory 510. Any suitable programming language can be used to implement the routines of particular embodiments including C, C++, Java, assembly language, etc. Different programming techniques can be employed such as procedural or object oriented. The routines can execute on a single computing device or multiple computing devices. Further, multiple processors 500 may be used.

The computing device typically includes a variety of computer system readable media. Such media may be any available media that is accessible by the computing device, and it includes both volatile and non-volatile media, removable and non-removable media.

System memory 510 can include computer system readable media in the form of volatile memory, such as random access memory (RAM) 520 and/or cache memory 530. The computing device may further include other removable/non-removable, volatile/non-volatile computer system storage media. By way of example only, storage system 540 can be provided for reading from and writing to a non-removable, non-volatile magnetic media (not shown and typically referred to as a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 515 by one or more data media interfaces. As will be further depicted and described below, memory 510 may include at least one program product having a set (e.g., at least one) of program modules that are configured to carry out the functions of embodiments described in this disclosure.

Program/utility 550, having a set (at least one) of program modules 555, may be stored in memory 510 by way of example, and not limitation, as well as an operating system, one or more application software, other program modules, and program data. Each of the operating system, one or more application programs, other program modules, and program data or some combination thereof, may include an implementation of a networking environment.

The computing device may also communicate with one or more external devices 570 such as a keyboard, a pointing device, a display, etc.; one or more devices that enable a user to interact with the computing device; and/or any devices (e.g., network card, modem, etc.) that enable the computing device to communicate with one or more other computing devices. Such communication can occur via Input/Output (I/O) interface(s) 560.

In addition, as described above, the computing device can communicate with one or more networks, such as a local area network (LAN), a general wide area network (WAN) and/or a public network (e.g., the Internet) via network adaptor 580. As depicted, network adaptor 580 communicates with other components of the computing device via bus 515. It should be understood that although not shown, other hardware and/or software components could be used in conjunction with the computing device. Examples include (but are not limited to) microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may use copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk. C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It is understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for collecting data artifacts from a production analysis environment, storing the data artifacts, and replaying the data artifacts in a testing environment, comprising: a first storage for receiving the data artifacts; a second storage for storing metadata concerning the data artifacts; a third storage for logs related to analysis of the data artifacts; and non-transitory memory comprising instructions that, when executed by one or more processors, cause the one or more processors to:
receive a data artifact; store the data artifact in the first storage with a unique identifier;
store in the second storage one or more records associating the unique identifier with a tag;
create an environment that simulates at least a portion of the production analysis environment;
receive a request to replay a set of one or more data artifacts by referencing the tag associated with the data artifact unique identifier;
replay each data artifact by causing the simulated production analysis environment to receive each data artifact as if it were a data artifact presently encountered in the production analysis environment, store in the third storage one or more logs of output from the simulated production analysis environment in response to the replay of the data artifact,
associating the stored logs with the data artifact unique identifier to facilitate querying the third storage; and
receive a request to query the third storage environment, wherein an interface is provided for querying the one or more logs of output based at least in part on the unique identifier of the data artifact or the unique identifier of a replay;
wherein a source of a received analytic and/or a source of the received request are prohibited from accessing the first storage directly, and all interactions with a data artifact by the source arc indirect, via referencing the unique identifier of that data artifact and using the provided interface as an intermediary.

2. The system of claim 1, wherein at least one of the data artifacts is from a source external to a network in which the production analysis environment operates.

3. The system of claim 1, wherein the data artifact is transmitted over a network to which other computing devices are connected, the data artifact would interfere with the operation of those computing devices if it were executed by one of those computing devices, and the data artifact is captured by a sensor in the network.

4. The system of claim 1, wherein a plurality of different data artifact types are stored together in the first storage.

5. The system of claim 4, wherein the plurality of different data artifact types includes captured network packets, files, system data files, and logs.

6. The system of claim 1, wherein the one or more logs of output stored in the third storage contain either the unique identifier of the data artifact that was replayed or the unique identifier of the replay that generated those logs.

7. The system of claim 1, wherein the interface allows for querying based additionally on a wildcard term.

8. The system of claim 1, wherein one or more data artifacts are periodically re-run through the simulated production analysis environment for regression testing.

9. The system of claim 8, wherein results of the regression testing are stored in the second storage and/or third storage.

10. The system of claim 1, wherein the queries on the third storage are performed by analytics targeting the output of the simulated production analysis environment.

11. The system of claim 1, wherein analytics targeting specific output are incorporated into the simulated production analysis environment.

12. The system of claim 1, wherein all the output of the simulated production analysis environment associated with a single replay is stored with the same unique identifier.

13. A computer-implemented method for collecting data artifacts from a production environment, storing the data artifacts, and replaying the data artifacts in a testing environment, comprising:
   receiving a data artifact from a sensor in the production environment;
   storing the data artifact in the first storage with a unique identifier;
   storing in the second storage one or more records associating the unique identifier with a tag;
   creating an environment that simulates at least a portion of the production analysis environment;
   receiving a request to replay a set of one or more data artifacts by referencing the tag associated with the data artifact's unique identifier;
   replaying each data artifact by causing the simulated production analysis environment to receive each data artifact as if it were a data artifact presently encountered in the production analysis environment;
   storing in the third storage one or more logs of output from the simulated production analysis environment in response to the replay of the data artifact, associating the stored logs with the data artifact unique identifier to facilitate querying the third storage; and
   receiving a request to query the third storage environment, wherein an interface is provided for querying the one or more logs of output based at least in part on the unique identifier of the data artifact or the unique identifier of a replay;
   wherein a source of a received analytic and/or a source of the received request are prohibited from accessing the first storage directly, and all interactions with a data artifact by the source are indirect, via referencing the unique identifier of that data artifact and using the provided interface as an intermediary.

14. The method of claim 13, wherein at least one of the data artifacts is from a source external to a network in which the production analysis environment operates.

15. The method of claim 13, wherein the data artifact is transmitted over a network to which other computing devices are connected, the data artifact is capable of interfering with the operation of those computing devices, and the data artifact is captured by a sensor in the network.

16. The method of claim 13, wherein a plurality of different data artifact types are stored together in the first storage.

17. The method of claim 16, wherein the plurality of different data artifact types includes captured network packets, files, system data files, and logs.

18. The method of claim 13, wherein the one or more logs of output stored in the third storage contain either the unique identifier of the data artifact or the unique identifier of a replay.

19. The method of claim 13, wherein the interface allows for querying based additionally on a wildcard term.

20. The method of claim 13, wherein one or more data artifacts are periodically re-run through the simulated production analysis environment for regression testing.

21. The method of claim 20, wherein results of the regression testing are stored in the second storage and/or third storage.

22. The method of claim 13, wherein the queries on the third storage are performed by analytics targeting the output of the simulated production analysis environment.

23. The method of claim 13, wherein analytics targeting specific output are incorporated into the simulated production analysis environment.

24. The method of claim 13, wherein all the output of the simulated production analysis environment associated with a single replay is stored with the same unique identifier.

* * * * *